United States Patent [19]

Mitchell et al.

[11] 4,093,066
[45] June 6, 1978

[54] ACOUSTICAL CONVEYOR COVER

[75] Inventors: Charles Ronald Mitchell, Marietta; Jason K. Sedam, Dunwoody, both of Ga.

[73] Assignee: The Coca-Cola Company, Atlanta, Ga.

[21] Appl. No.: 772,900

[22] Filed: Feb. 28, 1977

[51] Int. Cl.² .................................................. B65G 21/00
[52] U.S. Cl. ............................. 198/861; 181/200; 198/866
[58] Field of Search .............. 198/836, 860, 861, 952, 198/866; 186/1 R; 181/200–206, 256, 278, 287

[56] References Cited

U.S. PATENT DOCUMENTS

| 2,585,105 | 2/1952 | Frank | 198/861 |
| 2,710,683 | 6/1955 | McClenny, Jr. | 198/836 |
| 2,732,084 | 1/1956 | Chaussee et al. | 198/952 |
| 3,147,852 | 9/1964 | Hanson, Jr. | 198/861 |
| 3,263,776 | 8/1966 | Kroemer, Jr. | 186/1 R |
| 3,616,747 | 11/1971 | Lapeyre | 198/861 |
| 3,844,404 | 10/1974 | Emmenegger | 198/861 |
| 3,856,135 | 12/1974 | Hayakawa et al. | 198/861 |
| 3,878,936 | 4/1975 | Niggemyer | 198/861 |
| 4,043,444 | 8/1977 | Bobeczko | 198/866 |

FOREIGN PATENT DOCUMENTS

| 2,253,812 | 5/1974 | Germany | 198/861 |

Primary Examiner—Evon C. Blunk
Assistant Examiner—Richard K. Thomson
Attorney, Agent, or Firm—W. Dexter Brooks

[57] ABSTRACT

A cover for acoustically enclosing a conveyor is described. The cover includes a curved, dome-shaped or gabled top portion and two side walls which project downwardly from the top portion to a support structure for the conveyor. Also, the cover includes acoustically absorbent or dissipative material for attenuating noise internally generated within the cover. At least one of the side walls includes a pivotally mounted door which provides access to the conveyor. Since the cover is curved, dome-shaped or gabled and does not include any horizontal surfaces, an accumulation of moisture within the conveyor cover is prevented.

2 Claims, 2 Drawing Figures

ACOUSTICAL CONVEYOR COVER

FIELD OF THE INVENTION

The present application relates to a cover for a conveyor which provides a sanitary enclosure to facilitate the protection of articles on the conveyor from ambient debris, such as dirt, dust, glass fragments, and other unsanitary conditions. In addition, the present application relates to a conveyor cover including acoustically absorbent or dissipative material for reducing the noise level of the articles transported on the conveyor.

DESCRIPTION OF THE PRIOR ART

Heretofore, conveyor covers have been used to retain loose material on an endless conveyor belt. In many cases when loose material is being transported over open areas, the material on the conveyor is exposed to wind. Strong winds are sometimes sufficient in strength to disengage the material from the conveyor. Examples of such prior art patents are the Hansen patent, U.S. Pat. Nos. 3,147,852 and the Hayakawa et al patent, 3,856,135. It was the object of the Hansen and Hayakawa et al patents to design a conveyor cover to preclude the accidental removal of material from a conveyor by external forces, such as wind. These prior art covers were not designed for the purpose of reducing the noise internally generated within the conveyor cover or preventing the accumulation of moisture within the conveyor cover.

Other prior art, such as U.S. Pat. No. 3,196,389 to Fogg et al was designed for the purpose of providing a conveyor enclosure to ensure the passing of bottles from a washing station to a filling station in a sterile condition. However, the Fogg et al patent does not disclose a cover with a curved, dome-shaped or gabled top portion to prevent an accumulation of moisture within the conveyor cover. Also, this patent does not disclose additional means therein for attenuating noise internally generated within the cover to reduce the noise generated by the transportation of the articles on the conveyor. Further, the cover in Fogg et al patent does not disclose means to provide access to the conveyor.

SUMMARY OF THE INVENTION

Accordingly, it is a primary object of the present invention to provide a conveyor cover which includes a curved, dome-shaped or gabled top portion which prevents the accumulation of moisture within the conveyor cover.

It is another object of the present invention to provide a conveyor cover which includes means for attenuating noise internally generated within the cover.

It is another object of the present invention to provide a conveyor cover which includes means for providing access to the conveyor.

It is a further object of the present invention to provide a conveyor cover which includes means for permitting drainage of any moisture which may accumulate within the cover.

These and other objects of the present invention are fullfilled by constructing a conveyor cover with a curved, dome-shaped or gabled top portion and two side walls which project downwardly from the top portion to a support structure for the conveyor. Since the cover is curved, dome-shaped or gabled and does not include any horizontal surfaces, an accumulation of moisture within the conveyor cover is prevented. In addition, at least one of the side walls includes a pivotally mounted door which provides access to the conveyor. Also, the cover of the present invention includes an acoustically absorbent or dissipative material for attenuating noise internally generated within the cover. Finally, the connection between the side walls of the cover and the support structure for the conveyor includes openings to permit drainage of any moisture running down the sides of the cover assembly.

The conveyor cover assembly of the instant invention, reduces internally generated noise by as much as 10dBA or more. This capability of attenuating noise is particularly desirable in high speed production bottling plants. Also, since the containers are almost totally enclosed in this sanitary cover assembly, they are protected from ambient debris, such as dirt, dust, rock and flying glass fragments from bottle failures. The cover assembly of the instant invention, reduces the noise level requirements as required by the Occupational Safety and Health Administration (OSHA) and, also enhances the sanitary aspects of the plant as measured under Good Manufacturing Practices (GMP).

Other objects and further scope of applicability of the present invention will become apparent from the detailed description given hereinafter. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
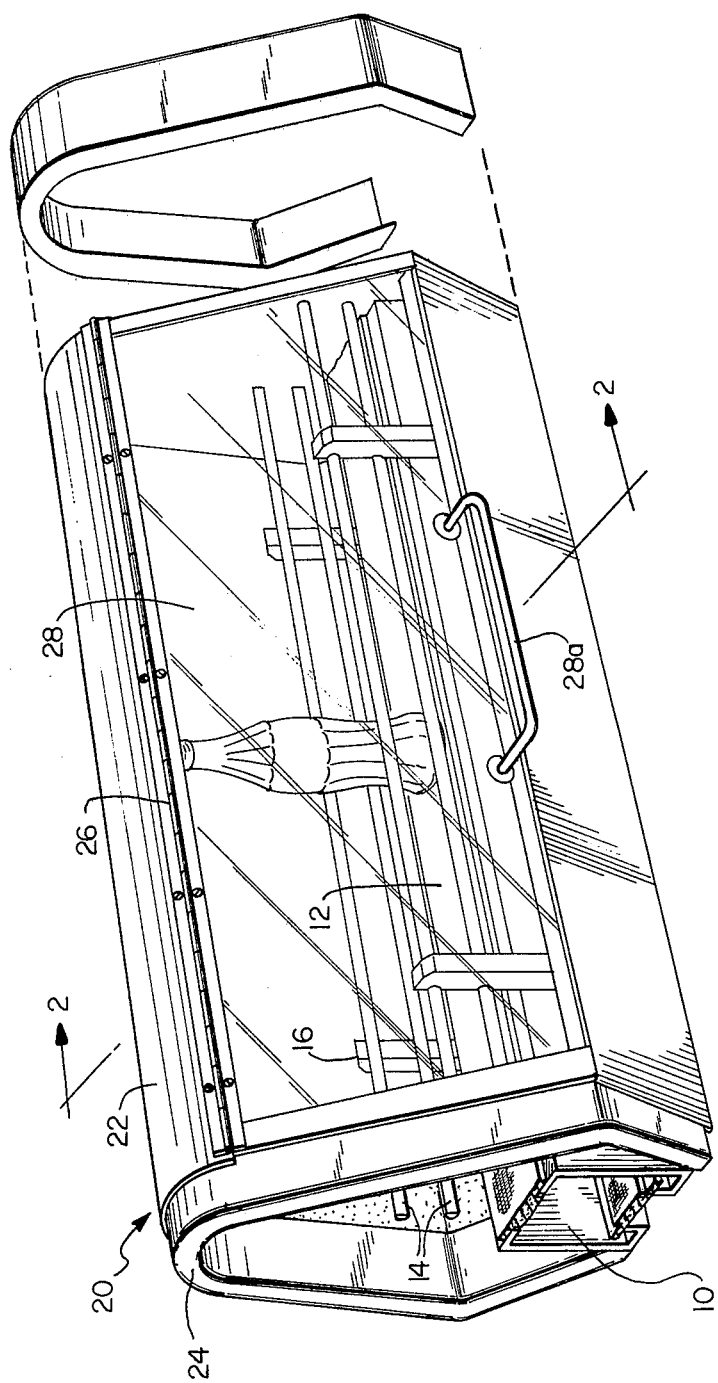
FIG. 1 is a perspective view of a portion of the conveyor cover assembly constructed in accordance with the principles of the present invention.

Referring in detail to FIG. 1, there is illustrated a conveyor cover assembly generally indicated by 20, which includes a cover body material 22 and end frame support members 24.

Also illustrated is a conventional conveyor assembly that comprises a conveyor support structure 10, which operatively retains the article conveying member 12. Guide support members 16 are mounted to the conveyor support structure 10 and include guide rails 14 that prevent the accidental dislodging of the articles from the conveying member 12.

A portion of the conveyor cover assembly 20, as shown in FIG. 1, includes a transparent viewing door 28 which permits inspection of the articles on the conveying member 12. The transparent viewing door 28 is mounted to the cover body material 22 by means of a hinge 26. The door also includes a handle 28a which permits an operator to open the transparent door and remove articles from the conveyor 12, if desired.

Figure 2:
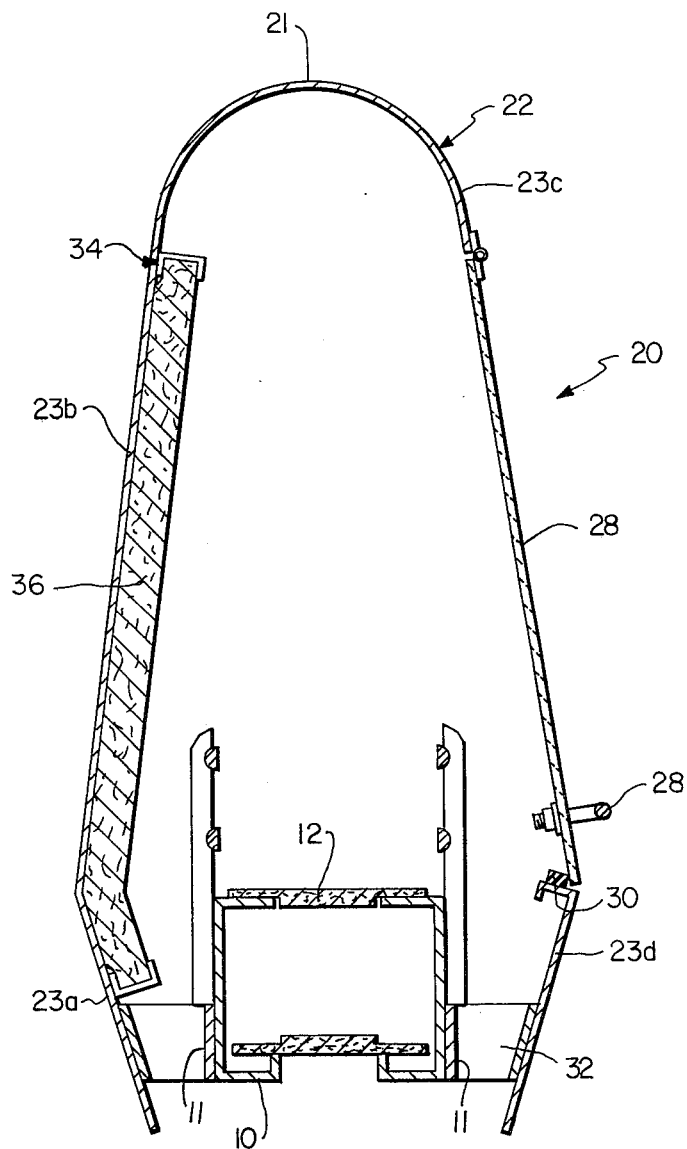
FIG. 2 is a cross-sectional view of the conveyor cover as shown substantially along the line 2—2 of FIG. 1.

Referring in detail in FIG. 2, there is illustrated a cross-sectional view of the conveyor cover assembly as shown substantially along the line 2—2 of FIG. 1 of this invention. From the curved, dome-shaped or gabled top portion 21, two upper portions of the sidewalls 23b and 23c project downwardly and join the lower portions of the sidewalls 23a and 23d, respectively. The 2 opposite ends of the lower portions of each of the sidewalls 23a and 23d are connected to end frame support members 24. The end frame support members 24 are in turn attached to the outwardly projecting frame member 11 of the conveyor support structure 10. Between end frame support members 24, the outwardly projecting member 11 positions the lower portions of the sidewalls 23a and 23d away from the conveyor support structure 10 to form bottom drainage openings 32. The drainage openings 32 permit the drainage of any moisture running down the sides of the cover assembly 20.

It should be noted, that since the conveyor cover is curved, dome-shaped or gabled and does not include any horizontal surfaces, an accumulation of moisture within the conveyor cover assembly 20 is prevented. Also, the curved, dome-shaped or gabled portion 21 provides a surface upon which the transparent viewing door 28 may rest in an inclined position when the door is in the open position. As shown in FIG. 2, the transparent viewing door 28 is pivotally hinged to the upper portion of the sidewall 23c by hinge 26. A gasket 30 provides a seal between the transparent viewing door 28 and the adjacent portion of the lower sidewall 23d.

The conveyor cover assembly is simple in design and constructed by forming end frame support members 24 out of a suitable material, such as stainless steel. The cover body material 22 is then wrapped around the end frames 24 and attached directly thereto. As aforesaid, the end frames 24 and the cover body material 22 are in turn suitably attached to frame member 11 of the conveyor support structure 10. This unique arrangement allows one to install, replace and remove the conveyor cover assembly with relative ease. For example, one needs to merely (1) attach the end frames 24 to the frame members 11 of support structure 10 and (2) wrap the cover body material 22 around the end frames 24. Stainless steel has been used in a preferred embodiment of the conveyor cover assembly of the present invention, but several other types of material, including plastic, are also acceptable. The unique shape and design of the conveyor cover assembly gives the body unit material strength, while providing no inside ledges upon which moisture may accumulate. The continuous hinge 26 may be made of stainless steel or plastic. The hinge retains the transparent viewing door 28, which may be opened to provide ready access to the conveyor. This transparent viewing door may be flat or bent to conform to the required shape of the conveyor cover assembly.

Referring further to FIG. 2, the upper portion of the sidewall 23b and the lower portion of the sidewall 23a, includes an acoustically absorbent material 36 which is releasably retained by means of clips 34. This acoustically absorbent or dissipative material attenuates noise generated by the transportation of articles on the conveyor 12. The acoustically absorbent or dissipative material may be positioned along certain sections, as desired, of the conveyor cover assembly.

In regard to the acoustically absorbent material, experiments have proven that in the preferred embodiment (see FIGS. 1-2) for containers up to 32 ounces, it is desirable to use one inch thick acoustical foam, totally encapsulated in a plastic film, and held in place by clips. Needless to say, the thickness of the acoustical foam is dependent on the size and resonant frequency of the containers to be transported on the conveyor. Accordingly, it is well within the purview of the artisan to determine such foam thickness. This arrangement provides a coating impervious to moisture and to strong cleaning solutions and also reduces the noise internally generated within the cover. The arrangement of these parts also minimizes the ledges upon which water may collect. It should be noted, that all joints may be sealed with an appropriate sealant and that each piece of acoustical foam may be removed on a regular basis for cleaning or replacement. Good results can be achieved by placing the foam between the clips under a slight compression. Positioning the foam in this manner conforms it to the shape of the cover assembly. Thus, the use of foam molded to the shape of the cover is not required as is normally required in known cover assemblies.

The shape of the conveyor cover assembly is such that the noise internally generated within the cover is reflected from the internal surfaces thereof and is absorbed or dissipated by the acoustically absorbent or dissipative material. However, as pointed out previously, the cover is not sealed to the conveyor at the bottom. This open area at the bottom between the end frames is designed to provide bottom drainage of any moisture accumulated within the conveyor cover assembly.

Many variations of the acoustically absorbent material may be used. For instance, additional foam sections may be utilized over different sections of the interior of the conveyor cover assembly. A variation may utilize acoustical foam which is permanently attached to the cover and protected by a perforated metal sheet. Another variation may utilize non-plastic-encapsulated foam sections which are removable on a periodic basis and squeezed like a sponge to remove any moisture. Another variation may utilize acoustically absorbent material which is plastic-encapsulated but not necessarily constructed of a foam material. Finally, a non-fibrous material that may be inherently sanitary may be utilized as the acoustically absorbent or dissipative material. It should also be noted, that the acoustically absorbent or dissipative material may undergo a bacteriostatic treatment to retard biological growth, which may preclude the need for a plastic film coating.

Other variations of this system may include different shapes of the cover assembly that serve the same unique purposes and features of the present invention, namely:
1. to prevent the accumulation of moisture within the cover;
2. to remain sanitary and prevent biological growth within the cover;
3. to prevent moisture from dripping into the articles on the conveyor and
4. to reflect internally-generated noise back inside the cover assembly where it may be absorbed or dissipated.

Moreover, while the preferred embodiments of FIGS. 1-2 illustrate the front sidewall to include an access door with a viewing means embodied into the access door, it should be apparent that the access door and viewing means could be separated. For example, a transparent window could be installed on one sidewall with a stainless steel door being embodied into the opposite sidewall. Further, due to the unique and simple wrap-around design of the cover, the transparent viewing/access door could be alleviated completely, and inspection made by merely sliding the cover aside.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. In combination with a conveyor, which transports articles between an article washing station and an article filling station, the improvement comprising:
   a conveyor cover including a top portion, the inside surface of said top portion forming a substantially continuous curve with the inside surfaces of a pair of sidewalls which extend downwardly from said top portion to a support structure for said conveyor;
   means for attenuating noise internally generated within said cover including acoustically absorbent material, said material being a compressible resilient material;
   door means connected in an opening in said conveyor cover for providing access to said conveyor, said door having a transparent portion to facilitate viewing of said articles on said conveyor within said cover;
   drain means provided between said support structure for the conveyor and the lower portion of said sidewalls for permitting drainage of any moisture within said cover; and
   means for releasably retaining said acoustically absorbent material including a pair of retaining clips mounted on the inside surface of a sidewall of said cover opposite to said door means, said retaining clips of said pair being so spaced as to retain said acoustically absorbent material therebetween in a compressed state, whereby said acoustically absorbent material conforms to the shape of the adjacent sidewall and holds itself between said clips with a self-biasing action.

2. The invention according to claim 1 wherein said conveyor cover comprises end frame members formed in the shape of said continuous curve and a flexible sheet of material wrapped around said end frame members, said flexible sheet of material forming said top portion and sidewalls of said conveyor cover.

* * * * *